US006578645B2

(12) United States Patent
Fahr

(10) Patent No.: US 6,578,645 B2
(45) Date of Patent: Jun. 17, 2003

(54) THROTTLE VALVE

(75) Inventor: Markus Fahr, Gottmadingen (DE)

(73) Assignee: Georg Fischer Rohrverbindungstechnik GmbH, Singen (DE)

( * ) Notice: Subject to any disclaimer, the term of this patent is extended or adjusted under 35 U.S.C. 154(b) by 90 days.

(21) Appl. No.: 09/810,205

(22) Filed: Mar. 16, 2001

(65) Prior Publication Data

US 2001/0022228 A1 Sep. 20, 2001

(30) Foreign Application Priority Data

Mar. 16, 2000 (DE) ........................................ 100 12 419

(51) Int. Cl.[7] ................................................ B23B 45/04
(52) U.S. Cl. ....................................... 173/169; 173/170
(58) Field of Search ................................ 173/169, 170; 60/399, 403, 406; 91/28, 29, 31, 59; 81/470; 137/463, 613

(56) References Cited

U.S. PATENT DOCUMENTS 3,667,345 A * 6/1972 Schaedler et al. .......... 173/169
3,746,813 A * 7/1973 Brown ....................... 173/170
3,791,459 A * 2/1974 Workman, Jr. .............. 173/177
3,861,476 A * 1/1975 Borsum ...................... 173/169
4,018,292 A * 4/1977 Roll et al. .................. 173/170
4,106,750 A * 8/1978 Karden et al. ......... 137/614.16
4,243,111 A * 1/1981 Willoughby et al. ........ 173/169
4,254,667 A * 3/1981 Wong ......................... 173/170
4,267,747 A 5/1981 Wallace et al.
4,444,091 A * 4/1984 Jorgensen, Jr. .............. 173/169
4,492,146 A * 1/1985 Workman, Jr. .............. 173/177
4,970,920 A * 11/1990 Albert et al. ................. 173/90
5,259,463 A * 11/1993 Bodell et al. ............... 173/138

* cited by examiner

*Primary Examiner*—Scott A. Smith
*Assistant Examiner*—Nathaniel Chukwurah
(74) *Attorney, Agent, or Firm*—Bachman & LaPointe, P.C.

(57) ABSTRACT

A throttle valve for hydraulically or pneumatically operated tools is proposed, comprising a valve housing which receives a throttle part and is arranged between the tool and the power fluid line, a first and a second apparatus being arranged to be in operative connection with the valve housing, the second apparatus being arranged to be actuatable to regulate the drive only after an intentional actuation of the first apparatus to prevent inadvertent or unauthorized actuation, the first apparatus having at least a first release mechanism for initial unlocking and a second release mechanism for further unlocking, the release mechanisms being movable in two directions (x, y) extending perpendicularly to one another, and the second apparatus for regulating the drive being arranged to be movable in a direction of rotation (z) extending parallel to the x direction.

7 Claims, 1 Drawing Sheet

THROTTLE VALVE

BACKGROUND OF THE INVENTION

The present invention relates to a throttle valve for hydraulically or pneumatically operated tools, comprising a valve housing which receives a throttle part and is arranged between a tool and a power fluid line, a first and a second apparatus being arranged to be in operative connection with the valve housing, the second apparatus being arranged to be actuatable to regulate the drive only after an intentional actuation of the first apparatus to prevent inadvertent or unauthorized actuation.

Hydraulically or pneumatically operated tools can be used on a remote construction site independently of an electrical power supply. The hydraulically or pneumatically operated tools are notable here for a compact structure and the high power that can be fed to the drive. Throttle valves are used to allow regulation of the energy supply to the drive. However, the high power fed to the tool can represent a substantial risk for the operator, especially in the event of inadvertent or unauthorized actuation. Consequently, safety devices for hydraulically or pneumatically operated tools are necessary.

U.S. Pat. No. 4,444,091 has disclosed a pneumatic valve with throttle capability and with a device for preventing inadvertent or unauthorized actuation. In a valve housing, arranged concentrically with one another from inside to outside, are a valve pin, a tubular shut-off part, a hollow cylinder closed at one end and an air volume control device. These parts of the arrangement are moved, in the normal case, in two mutually opposite directions perpendicular to the main axis of the valve housing. These movements take place against the spring force of two springs. Arranged at the end of the valve pin are detent balls which, as a result of the conically extending inside surface of the hollow cylinder, can bring about a coupling of the movement of the valve pin with the movement of the shut-off part. The air feed to a compressed air-operated motor is enabled only when the hollow cylinder and the valve pin have been actuated in two mutually opposite directions in succession. The valve pin is actuated by a lever on one side of the housing and the hollow cylinder has to be actuated from the opposite side of the housing. The maximum air volume allowed through can be set by rotating the hollow cylinder by means of a screwdriver. Substantially, the valve allows not continuous adjustment but only a settable open/shut adjustment. The apparatus for preventing inadvertent or unauthorized actuation is accessible and capable of operation only in two precisely defined areas of the valve housing.

On the basis of this prior art, it is an object of the invention to provide a throttle valve for hydraulically or pneumatically operated tools which is constructed from as few parts as possible and which, independently of its position of installation relative to the tool, can be operated by the operator in any position safely, without risk of injury and in accordance with correct ergonomic principles.

SUMMARY OF THE INVENTION

The foregoing object is achieved by a throttle valve for hydraulically or pneumatically operated tools, comprising a valve housing which receives a throttle part and is arranged between the tool and the power fluid line, a first and a second apparatus being arranged to be in operative connection with the valve housing, the second apparatus being arranged to be actuatable to regulate the drive only after an intentional actuation of the first apparatus to prevent inadvertent or unauthorized actuation, the first apparatus having at least a first release mechanism for initial unlocking and a second release mechanism for further unlocking, the release mechanisms being movable in two directions (x, y) extending perpendicularly to one another, and the second apparatus for regulating the drive being arranged to be movable in a direction of rotation (z) extending around the x direction.

It is advantageous that at least the first apparatus for preventing inadvertent or unauthorized actuation can be simply and safely operated by the operator in any position. This is achieved in that the first release mechanism is designed as a release ring, which is arranged to be movable in the direction of the housing axis by displacement towards the valve housing. This is also achieved in that the second release mechanism is designed as a latch having a free end and arranged to be movable in a direction perpendicular to the housing axis. Moreover, this is additionally achieved in that the release ring has a projection oriented radially to the housing axis which engages against the spring force of a conical wire spring in an annular seating on the valve housing so that the release ring is arranged to be movable resiliently in the direction of the housing axis for unlocking the second release mechanism.

It is also advantageous that the drive of the hydraulically or pneumatically operated tool can be simply and precisely adjusted. This is achieved in that the second apparatus is designed as a rotating sleeve which is arranged to be movable in the direction of rotation around the housing axis in operative connection with the valve housing. This is also achieved in that the rotating sleeve for controlling the drive is connected to a control pin which interacts with a control ramp on the throttle part in such a way that the rotational movement of the rotating sleeve about the housing axis moves the throttle part in the direction of the housing axis and regulates the fluid feed from the fluid line for the hydraulic or pneumatic drive of the tool.

It is further advantageous that the risk of injury for the operator in operating the hydraulically or pneumatically operated tools is prevented. This is achieved in that a detent is arranged in the release ring and interacts with the freely movable end of the latch for unlocking in such a way that the latch can only be moved after an intentional actuation of the release ring against the spring force of the conical wire spring in a direction perpendicular to the housing axis.

BRIEF DESCRIPTION OF THE DRAWING

An example of embodiment of the invention is described with reference to the figure, in which.

DETAILED DESCRIPTION

Figure 1:
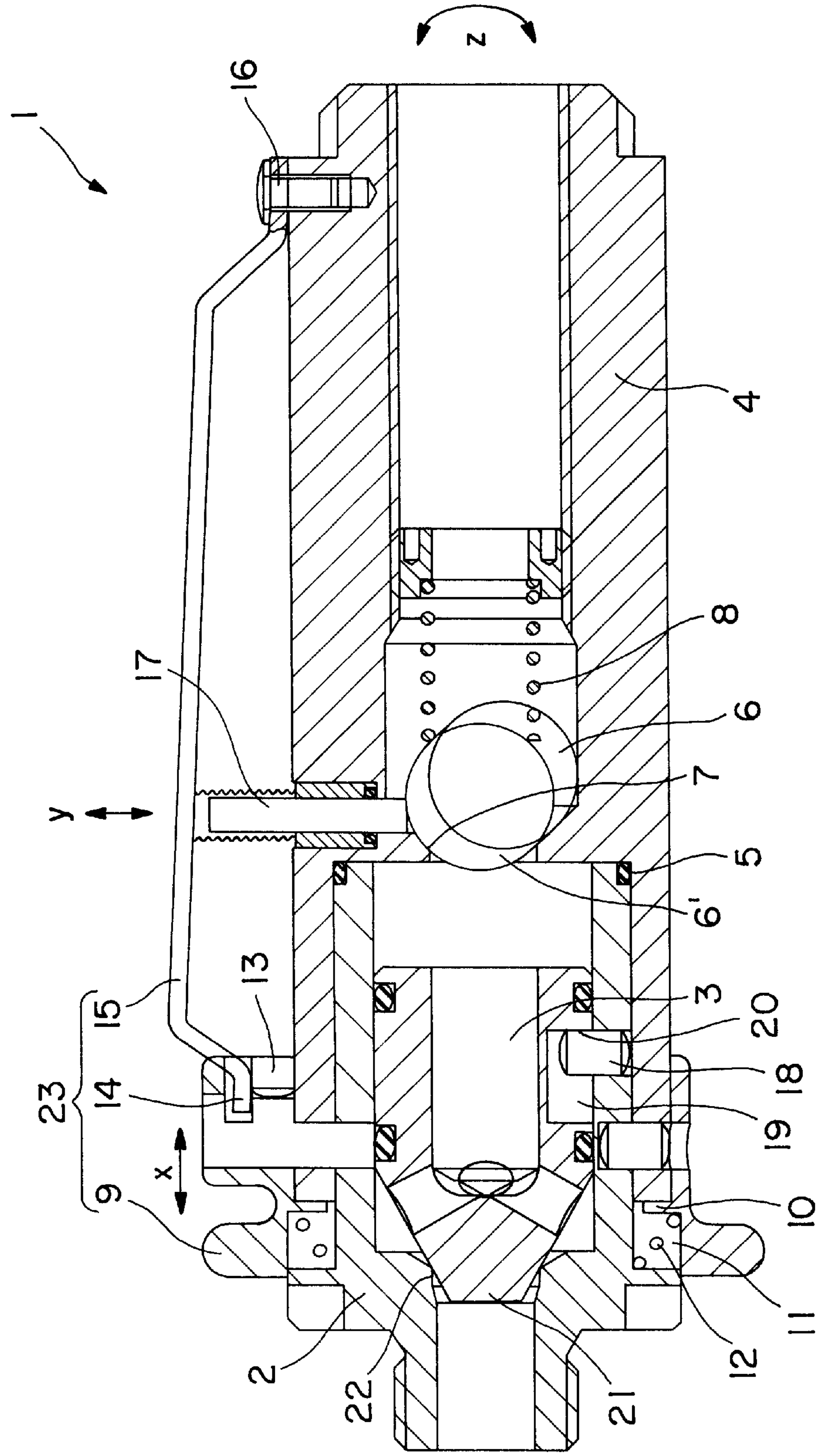
FIG. 1 shows a section through a throttle valve according to the invention.

FIG. 1 shows a cut-away view of a throttle valve 1 of the type that may be used for regulating the drive of pneumatically or hydraulically operated tools. The throttle valve 1 substantially comprises, from left to right, a valve housing 2, a throttle part 3 and a rotating sleeve 4. The throttle valve 1 is shown cut along the main axis (x) of the valve housing. On the left-hand side of the valve housing 2 as shown in FIG. 1, a tool (not shown) with a hydraulic or pneumatic drive can be connected. On the right-hand side, a fluid line (not shown) can be connected by means of an appropriately fitting coupling.

The rotating sleeve 4 is rotatably mounted and arranged by means of an annular seal 5 to be movable in a fluid-tight manner around the valve housing 2. Visible within the rotating sleeve 4 is a shut-off ball 6, which is pressed by a spring 8 against a seat 7. In the normal case, this arrangement of seat 7, shut-off ball 6 and spring 8 cuts off the supply of fluid from the fluid line to the valve housing 2 and hence to the tool. This normal case is indicated by the centrally arranged shut-off ball 6'.

A release ring 9 is shown extending in an annular manner around the outside of the valve housing 2. The release ring 9 has a radially inward-facing annular projection 10, which engages into a seating 11 on the periphery of the valve housing 2. A conical wire spring 12 is also arranged in the seating 11. The conical wire spring 12 presses, under lesser tension, the projection 10 and hence the release ring 9, which is integrally connected to the projection 10 from left to right into the seating 11. A detent 13 is arranged within the release ring 9, at a position protected against interference. If the release ring 9, against the spring force of the conical wire spring 12, is moved from right to left in the direction of the main axis (x) of the valve housing 2, the detent 13 releases the free end 14 of a latch 15. The latch 15 is substantially an arm, clamped at one end, which is secured in a resilient or hinged manner by means of a screw 16 on the outside of the rotating sleeve 4.

The latch 15 can be moved only up and down in a direction (y) perpendicular to the axis (x) of the valve housing 2. Arranged below the latch 15 is a needle roller 17 which is resiliently arranged and leads in a fluid-tight manner through the outer wall of the rotating sleeve 4 in the region of the shut-off ball 6.

As a result of the movement in the y direction, the fluid feed from the fluid line to the valve housing 2 is enabled. However, the latch 15 can be moved in the y direction only when the release ring 9 with the detent 13 has been moved in the x direction and has released the free end 14 of the latch 15. The detent 13 and the free end 14 of the latch 15 are so arranged that there is no risk of the operator's being trapped or injured.

The release ring 9 and the latch 15 together form a dual apparatus 23 for preventing inadvertent or unauthorized actuation of the throttle valve 1. Only when the release ring 9 and the latch 15 are actuated in succession can the rotating sleeve 4 also be rotated. Connected to the rotating sleeve 4 is a control pin 18 which engages into a recess 19 on the throttle part 3. The recess 19 on the outer periphery of the throttle part 3 has a control ramp 20. As a result of the interaction of the control pin 18 with the control ramp 20, a rotational movement of the rotating sleeve 4 in the z direction about the housing axis x is converted into a linear movement of the throttle part 3 in the x direction.

The throttle part 3 has a conical shape at one end 21, which interacts with a conical seat 22 on the valve housing 2 and controls the feed of fluid to the tool. The conical seat 22 and the end 21 of the throttle part 3 can also be of other than conical design. The characteristic curve of the throttle valve 1 can be defined by the design of the end 21 of the throttle part 3. The rotational movement of the rotating sleeve 4 about the axis (x) of the valve housing 2 controls the power supply to the tool and hence the speed or output in a manner familiar from a hand throttle on a motor cycle. The arrangement of release ring 9 and latch 15 is particularly ergonomically advantageous, and the throttle valve 1 can be operated equally simply in any position, independently of the position of installation on the tool. When securing the throttle valve 1 on a tool, it is no longer necessary to use any washers in order to achieve suitable alignment of the throttle valve relative to the tool. As a result of the ergonomically advantageous arrangement, operator fatigue is also counteracted. As a result of the division of the apparatus 23 for preventing unauthorized or inadvertent actuations over two release mechanisms 9, 15 acting in clearly distinct directions (x, y), the risk of the tool being switched on inadvertently is significantly reduced.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A throttle valve for one of hydraulically and pneumatically operated tools, comprising a valve housing having an axis x which receives a throttle part and is arranged between a tool and a power fluid line, a first and a second apparatus being arranged to be in operative connection with the valve housing, the second apparatus being arranged to be actuatable to regulate the drive only after an intentional actuation of the first apparatus to prevent inadvertent or unauthorized actuation, wherein the first apparatus has at least a first release mechanism for initial unlocking and a second release mechanism for further unlocking, the first and the second release mechanisms being movable in two directions, x and y, respectively, which extend perpendicularly to one another, and the second apparatus for regulating the drive being arranged to be movable in a direction of rotation z around the x direction.

2. A throttle valve according to claim 1, wherein the first release mechanism comprises a release ring, which is arranged to be movable in the direction x which is substantially parallel to the axis x of the housing by displacement towards the valve housing.

3. A throttle valve according to claim 1 or 2, wherein the second release mechanism is designed as a latch having a free end and arranged to be movable in the direction y substantially perpendicular to the axis x.

4. A throttle valve according to claim 3, wherein the latch interacts with a needle roller movable perpendicularly to the housing axis x in the rotating sleeve, the needle roller moving a shut-off ball such that the actuation of the latch enables the fluid feed from the fluid line to the valve housing.

5. A throttle valve according to claim 2, wherein the second apparatus is designed as a rotating sleeve which is arranged to be movable in the direction of rotation z around the housing axis x in operative connection with the valve housing.

6. A throttle valve according to claim 5, wherein a detent is arranged in the release ring and interacts with the freely movable end of the latch for unlocking such that the latch can only be moved after an intentional actuation of the release ring against the spring force of the conical wire spring in a direction y perpendicular to the housing axis x.

7. A throttle valve according to claim 2, wherein the release ring has a projection oriented radially to the housing axis x which engages against the spring force of a conical wire spring in an annular seating on the valve housing so that the release ring is arranged to be movable resiliently in the direction of the housing axis x for unlocking the second release mechanism.

* * * * *